(12) United States Patent
Rodriguez et al.

(10) Patent No.: US 6,195,389 B1
(45) Date of Patent: Feb. 27, 2001

(54) MOTION ESTIMATION SYSTEM AND METHODS

(75) Inventors: Arturo A. Rodriguez, Norcross; Timothy W. Simerly, Cumming, both of GA (US); Neilesh R. Patel, Boston, MA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/061,625

(22) Filed: Apr. 16, 1998

(51) Int. Cl.[7] .................................................. H04N 7/12
(52) U.S. Cl. ............................................. 375/240.16
(58) Field of Search .......................... 375/240; 348/384, 348/390, 400, 401, 402, 409, 415, 416, 699, 700; 382/232, 236, 238

(56) References Cited

U.S. PATENT DOCUMENTS

| 5,428,403 | * | 6/1995 | Andrew ................................. | 348/699 |
| 5,537,155 | | 7/1996 | O'Connell et al. .................. | 348/699 |
| 5,673,339 | | 9/1997 | Lee ....................................... | 382/236 |
| 5,699,129 | | 12/1997 | Tayama ................................ | 348/699 |
| 5,719,631 | | 2/1998 | Pandel .................................. | 348/416 |
| 5,781,249 | * | 7/1998 | Hwang ................................. | 348/699 |

FOREIGN PATENT DOCUMENTS

| 0 446 001 | 9/1991 | (EP) . |
| 0 565 253 A2 | 3/1993 | (EP) . |
| 0 579 319 | 1/1994 | (EP) . |
| 0 605 834 | 7/1994 | (EP) . |
| 0 609 022 | 8/1994 | (EP) . |
| 0 707 258 A2 | 10/1995 | (EP) . |
| 0 813 138 A1 | 6/1997 | (EP) . |
| 0 831 642 | 3/1998 | (EP) . |
| 2188509 | 9/1987 | (GB) . |
| 2292039 | 2/1996 | (GB) . |
| 2317525 | 3/1998 | (GB) . |
| WO 97/18508 | 5/1997 | (WO) . |

OTHER PUBLICATIONS

Publication etitled "Fast Motion Vector Estimation for Video Coding Based on Multiresolution–Spatio–Temporal Correclations" by Junavit Chalidabhongse, Sumngook Kim and C.–C. Jay Kuo as published on pages 645–656 of the proceedings of "Visual Communications and Image Processing '96" held on Mar. 17–20, 1996 in Orlando, Florida.

* cited by examiner

Primary Examiner—Chris S. Kelley
Assistant Examiner—Allen Wong
(74) Attorney, Agent, or Firm—John Eric West; Kenneth M. Massaroni; Kelly A. Gardner

(57) ABSTRACT

Techniques for doing motion estimation in video encoding. A predictor block which is a best match for a current block is located by comparing the current block of the picture currently being encoded with candidate blocks that are located using the motion vectors of blocks that are either spatially or temporally proximate to the current block. If a given proximate block does not have a usable motion vector, another proximate block is used. The temporally proximate blocks are blocks in the last picture to be encoded prior to the current picture. The candidate blocks are further used to define a minimized portion of the search space which will fit inside the local RAM of the processor used to compare the current block with the candidates. The minimized search space is used in a two-phase method which begins with the candidates located using the proximate blocks and continues with a diamond-shaped search space centered on the best candidate located using the proximate blocks. The duration of the search method is controlled by three thresholds. Each succeeding one of the thresholds requires a closer match for the predictor than the previous threshold. The size and shape of the diamond-shaped search space may vary according to the motion vectors of previous predictors and according to the number of processor cycles that are available to perform the search. Similarly, the number and locations of the proximate blocks may vary according to the motion vectors of previous predictors and the number of processor cycles available.

34 Claims, 9 Drawing Sheets

MOTION ESTIMATION SYSTEM AND METHODS

Cross Reference to Related Patent Applications

Background of the Invention

1. Field of the Invention

The invention concerns encoding sequences of digital pictures generally and more specifically concerns the motion estimation operations performed while encoding a sequence of digital pictures.

2. Description of the Prior Art

The following Description of the Prior Art first discusses compression of digital pictures generally, then motion estimation as currently practiced, and finally, the problems of the current techniques.

Compression of Digital Pictures

Digital pictures are originally represented in the memory of a computer system as arrays of picture elements or pixels. Each pixel represents a single point in the picture. The pixel itself is an item of data and the contents of the item of data determine how the point represented by the pixel will appear in the digital picture. The quality of a digital picture of course depends on the number of pixels in the picture and the number of bits in the pixels. The more pixels there are in the picture, the finer the resolution, and the more bits in each pixel, the more information it can store about the point in the image represented by the pixel. For instance, the more bits in the pixel, the more shades of color it can represent.

Because this is the case, the arrays of pixels used to originally represent high-quality digital pictures are very large and require large amounts of memory. The size of the arrays is particularly troublesome when the digital pictures in question are part of a sequence of pictures that when seen in the proper order and with the proper timing make a moving picture. The apparatus that is displaying the sequence of pictures must be able not only to store them but also to read and display them quickly enough so that the timing requirements for the moving pictures are met.

The problems of timing and storage are particularly severe where the sequence of digital pictures is distributed by means of a medium with limited bandwidth to a receiver with limited storage. Examples where this is the case are digital television, videoconferencing, or videotelephony. In these applications, the sequence of pictures must be transmitted by means of a broadcast or cable television channel, a telephone line, or a computer network to a relatively low-cost consumer device such as a television set, video telephone, or personal computer with limited amounts of memory to store the pictures. These applications are consequently economically practical only if some way is found to compress the digital pictures and thereby to reduce the bandwidth required to transmit the pictures and/or the storage required to store them at their destinations.

The art has developed many different techniques for compressing sequences of digital pictures. One example of these techniques is the MPEG-2 standard for compressing digital video, described in Background Information on MPEG-1 and MPEG-2 Television Compression, which could be found in November 1996 at the URL http://www.cdrevolution. com/text/mpeginfo. htm. All of these techniques take advantage of the fact that a sequence of digital pictures contains a great deal of redundant information. One type of redundancy is spatial: in any picture, pixels that are spatially close to each other tend to have similar characteristics. Since that is the case, it is often possible to describe a picture as a set of regions of spatially-adjacent pixels. Regions may of course overlap. Where the regions are rectangular, they are referred to as blocks. Where a given area of the picture strongly resembles another area of the picture but is not identical to the other area, it is possible to replace the pixels in the given area with a representation that describes the given area in terms of the difference between it and the given area.

The other type of redundancy in a sequence of pictures is temporal; very often, a given picture in the sequence is very similar in appearance to an earlier or later picture in the sequence; it is consequently possible to compress the given picture by making a representation of the given picture that represents the differences between regions in the given picture and regions in an earlier or later picture, termed herein the reference picture, and using this representation in place of the representation as an array of pixels.

One way of expressing the difference between the given picture and the reference picture is shown in FIG. 1. Digital reference picture 101 is represented in memory as an array of pixels 105. The picture is further divided into blocks 103, each of which is typically 16 pixels square. An object 107 in reference picture 101 is contained in four adjacent blocks 103: blocks 103(m,n), (m+1,n), (m,n+1), and (m+1,n+1), where m and n denote the x and y coordinates of the upper left-hand corner of the block. In given picture 109, object 107 is in a different position, namely blocks 103(b,s), (b+1,s), (b,s+1), and (b+1,s+1), but object 107 otherwise has substantially the same appearance as in reference picture 101. Since that is the case, object 107 can be described in the compressed representation of given picture 109 in terms of its differences from object 107 in reference image 101. There are two kinds of differences:

the change of location of object 107 in given picture 109; and any change of appearance of object 107 in given picture 109.

The first kind of difference can be described in terms of an offset of object 107 in picture 109 from its position in reference picture 101. The second kind can be described in terms of the difference between the appearance of object 107 in picture 109 and the appearance of object 107 in reference picture 101. The changed appearance can be caused by factors such as varied illumination incident on object 107 or warping or shearing of the object due to rotation about the x axis, the y axis, or the z axis perpendicular to the plane of the picture.

The use of compression techniques such as the ones just described permit the creation of compressed representations of sequences of digital pictures which are small enough to satisfy the bandwidth and memory constraints typical of commercial digital television, digital teleconferencing, and digital videotelephony. The production of a compressed representation of a digital picture from a pixel representation of the digital picture is termed herein encoding the picture.

In hybrid video coding methods, temporal redundancies are typically removed by predicting block data in the picture that is undergoing encoding (i.e., the current picture) from the data in one or more reference pictures. At the point in time that an encoder engine (that is, encoding software or microcode executing on a processor) is compressing the current picture, such reference pictures have already been compressed and possibly transmitted. However, since those pictures are destined to be used as reference pictures for the compression of subsequent pictures, while the encoder engine is compressing such reference pictures, it reconstructs and retains them in memory so that it can later retrieve them and use them as reference pictures. By reconstructing the compressed reference pictures in memory, the encoder engine simulates a decoder engine that is able to decode pictures encoded by the encoder engine. This is because a decoder engine would be part of a receiver for the digital pictures and would not have access to the original pictures but only to their reconstructed versions that inherently exhibit signal loss (i.e., degradation) as a result of compression.

Motion Estimation and Block Matching Criteria

Since a video signal can exhibit high motion, exploitation of the temporal redundancy is best achieved by using motion estimation/compensation techniques to allow blocks of the same size at different spatial offsets in the reference picture (s) to predict the block's data in the current picture. Although not optimal, for practical reasons in cost-effective multimedia systems, block-based motion estimation/compensation techniques assume only translational motion, that is, that the blocks have moved but have not rotated. Consequently, a block-based motion estimation/compensation method is part of most hybrid video coding methods and a key component of all existing video coding standards such as MPEG-1[1], MPEG-2[2], H.261[3], and H.263[4]. Motion estimation is the process of finding the block in the reference picture that best matches the current block currently being encoded in the current picture. The block in the reference picture that best matches the current picture is called the predictor, because it predicts the motion and pixel values of the current block with reference to the predictor block.

As an example, if the block size is 16×16 pixels as is the case in many existing video coding standards, and the corresponding search space (i.e., the portion of the reference picture in which the encoding engine looks for a predictor) in the reference picture is of size equal to 64×48, the job of motion estimation is to find the contiguous 16×16 block in the search space that is the best predictor for the current block. Consequently, there are 1617 (i.e., 49×33) candidate blocks, that is, 16×16 blocks in the search space that are candidates to be the predictor for the current block. The predictor is chosen from among the candidates by matching the current block with each of the candidates. The candidate that best matches the current block is the predictor.

This part of motion estimation is called block matching. Block matching is done using a matching criterion. Typical matching criteria are the Sum of Pixel Absolute Errors (SAE) and the Sum of the Squared Pixel Errors (SSE). It is noted that the words Error and Differences are used with equivalent meaning within the same context by those skilled in the art. Hence, SAD and SAE refer to the same block matching computation. Likewise, SSD and SSE are equivalent.

For our example, SSE is defined for each (u, v) offset in the search space as:

$$SSE(u, v) = \sum_{i+1}^{16} \sum_{f=1}^{16} [P_{curr}(i, j) - P_{ref}(i+u, j+v)]^2$$

where $P_{curr}$ is the block being predicted using motion estimation in the current picture and $P_{ref}$ is a candidate block in the search space in the reference picture displaced from $P_{curr}$ by the vector (u, v). Although not a requirement for the invention disclosed herein, if the 64×48 search space in our example is assumed to be concentric with the current block, candidate blocks would range in offsets from −24 to +24 in the horizontal and −16 to +16 in the vertical.

For our example, SAE is defined for each (u, v) offset in the search space as:

$$SAE(u, v) = \sum_{i+1}^{16} \sum_{f=1}^{16} [P_{curr}(i, j) - P_{ref}(i+u, j+v)]$$

The candidate block that globally minimizes the matching criterion is selected as the best matched block and its corresponding displacement from the coordinates of the current block becomes the motion vector for the current block. The motion vector is encoded in a way that it is fully recoverable from the compressed video stream produced by the encoder engine so that a compliant decoder engine can perform motion compensation during the reconstruction of the current picture. Hence, the output of motion estimation is a motion vector for the current block that indicates the displacement of the coordinates of the top left corner of the current block from the coordinates of the corresponding corner of the predictor.

Each picture in a digitized video sequence consists of three planes of information, one of luminance and two of chrominance. Motion estimation is typically performed in the luminance domain whereas motion compensation must be performed for all three planes to reconstruct the pictures. Each plane of information consists of 8-bit values (i.e., bytes). Typically, the dimensions of the luminance plane are equivalent to the picture resolution and each pixel has its own 8-bit luminance representation.

For our example, SSE would require 256 subtractions, 256 squaring operations (i.e., multiplies), and 255 additions for each candidate. SAE replaces the multiply operation with an absolute value. Matching criteria of lesser computational complexity are rarely employed in practice due to their inferior prediction performance. Hence, motion estimation is a computationally intensive operation with either the SAE or SSE matching criterion. Furthermore, for each block in the current picture, the matching criterion must be computed for each considered candidate block in the reference picture. Pictures of size equal to CCIR 601 resolution (720×480) have 1350 non-overlapping 16×16 blocks that individually undergo motion estimation. For a search space of size of 64×48 (i.e., 1617 candidate blocks), an encoder engine with a motion estimation system that considers every candidate block must compute the block matching criterion approximately 2,182,950 (1350×1617) times per picture, with pictures being encoded at the rate of 30 pictures per second. Consequently, motion estimation is typically the most compute-intensive component of hybrid video coding methods.

The full search motion estimation method described above guarantees locating a predictor block in the search space that produces the global minimum score for the matching criterion but requires an enormous amount of compute power. The method works well where costly encoder engines can be tolerated. Difficulties arise, however, when the encoder engine is part of a consumer system such as a video telephone. Cost constraints here require that the encoder engine be implemented using a relatively low-cost processor such as a low-cost digital signal processor (DSP) or RISC processor, and the demands of the full search motion estimation method will exceed the capabilities of the low-cost processor. In such situations, so-called fast motion estimation methods must be utilized.

Fast motion estimation methods

The aim of fast motion estimation methods is to reduce the number of candidate blocks that are compared with the current block. The drawback of these methods is that there is no guarantee that the candidate that in fact best matches the current block will be chosen as the predictor. The end effect of the methods is that a reduction in computation cycles is traded for either lower picture quality or less compression, or both. The proposed methods can be categorized as follows.

1. Methods that reduce the number of candidate blocks in the search space that are considered as predictors by using heuristics. Examples of such methods are the logarithmic search and the three-step search methods.
2. Hierarchical search methods that simultaneously reduce the number of pixels in the computation of the block matching criterion and the number of considered candidate blocks. These methods generate successive lower resolution of the current and reference pictures by decimating or low-pass filtering by a factor of two in both the horizontal and vertical. Block matching is performed at the smallest available resolution and the results are mapped to the next higher resolution where a limited number of block candidates are considered at displacements localized around the mapped best match.
3. Methods that use motion vectors of blocks that are proximate to the current block to locate candidate blocks.

For further details on the first two classes of methods, see V. Bhaskaran and K. Konstantinides, "Image and Video Compression Standards," Kluwer Academic Press, 1995, and K. R. Rao and J. J. Hwang, "Techniques & Standards for Image, Video, and Audio Coding," Prentice Hall Press, 1996. For an example of the third class, see Junavit Chalidabhongse, Sungook Kim, and C.-C. Jay Kuo, "Fast Motion Vector Estimation for Video Coding Based on Multiresolution-Spatio-Temporal Correlations," *Proceedings, Visual Communications and Image Processing '96*, International Society for Optical Engineering, vol. 2727, pp. 645–656.

The three-step motion estimation method, for instance, reduces the number of candidate blocks by sub-sampling the search space. For a motion vector range of ±7, the three-step method proceeds in a set of three stages, each successively fine tuning the location of the search space per the best matching criterion score found in the set of candidate predictors in the prior stage, and by successively reducing the size of the window of remaining candidate blocks under consideration. The first stage begins by first examining nine candidates with offsets ranging from ±4 from the spatially corresponding origin of the current block in the reference picture, including the candidate at the origin. That is, the coordinates of the nine predictors considered are: (0,0), (4,0), (−4,0), (0,4), (0,−4), (4,4), (4,−4), (−4,4). The offset with the minimum matching criterion value is then used as the origin for examining eight more candidates at offsets of ±2 around this new origin. Finally, the best match found in the second stage is used as the new origin for eight more candidates at offsets of ±1. The displacement found at the end of stage three serves as the predictor for the current block. In all, this method typically requires computing the matching criterion on candidates at 25 different offsets (nine offsets for stage one, eight for stage two, and eight for stage three). It is noted that this method is dependent on the search space size. When the search space is expanded to support a motion vector range of ±15, the number of considered offsets increases to 65 because the first stage consists of the 49 offsets resulting from sub-sampling the search space by 4 in the horizontal and vertical.

Other fast motion estimation methods operate on the same principle as the three-step method. The logarithmic search performs a coarse to fine sub-sampling of the search space with the same offsets as the three-step search for a ±7 motion vector range. However, for a ±15 motion vector range, it requires four stages where the sub-sampling of the search space is performed at offsets of ±8, ±4, ±2, ±1. Although there are less than 33 candidate positions examined using this method for a ±15 motion vector range, its performance is poor since there is a greater chance that method will find a predictor that reflects a local minimum of the search space.

The insight which forms the starting point for techniques involving blocks that are proximate to the current block is that there is a very high probability that areas which are closely related to the current block will move in the same fashion as the current block. Consequently, if a motion vector for a block in a closely-related area is known, there is a high probability that the current block will have that motion vector. It therefore makes sense to use the motion vector from one of these related blocks to locate a candidate block in the reference picture for the current block. The candidate block is simply that block in the reference picture whose location in the reference picture is such that when the motion vector from the related block is applied to it, the result is the current block. A further insight is that in a digital picture, a block that is related to another block is liable to be located in close proximity to the other block. The proximity may be either with regard to blocks in previously-encoded pictures or with regard to blocks in the current picture. One will thus often be able to substantially reduce the number of blocks that must be compared to find the predictor for the current block by simply beginning the search for the predictor with candidate blocks that are located using blocks that are in close proximity to the current block. Such blocks will be termed in the following proximate blocks.

The techniques of the Chalidabhongse, et al. reference use proximate blocks in the current picture and in the picture that precedes the current picture to find a best candidate, and that candidate is used as a starting point for further refinement which works by searching the eight points around the best candidate, using the best candidate found in that search in a further eight points, and so on until a matching result that is below a threshold is reached. Other variations on this technique are presented, and the reference also discloses how the technique may be used in a hierarchical search.

Problems with known motion estimation techniques

The fast motion estimation techniques described above all offer an unattractive trade off between the number of candidate blocks and the probability that the best predictor will be found. Additionally, none of the fast motion techniques takes into account the fact that digital systems built for consumer use have strict memory constraints, and consequently strict constraints on the size of the search space. In particular, digital system built for consumer use employ digital signal processors (DSPs) that operate most efficiently on data contained in a RAM internal to the DSP, and consequently, searches are done most efficiently if the entire search space can be transferred to the DSP's internal RAM. Since the size of the search space is constrained in this fashion, the search techniques must ensure that there is a very great possibility that the search space contains the predictor. The methods described above consider only a subset of the blocks in their search spaces as candidates, and consequently cannot efficiently use their search space or the memory in which the search space is contained. Moreover, the only way that the methods described above can efficiently increase the range over which they examine candidates is by increasing the amount of internal RAM in the DSP. Hence, these methods necessarily give inferior motion estimation when employed in systems built for consumer use.

It is noted that it is not practical to transfer one candidate block at a time from memory that is external to the DSP into internal DSP Data RAM because adjacent candidate blocks can have as much as 15 of 16 columns (or rows) in common and because it would impose severe delay on a real-time system. Hence, it is more efficient to transfer as much area from the search space as possible into internal DSP Data RAM in a given operation. The above problems are particularly acute with hierarchical search methods. These methods require additional memory for the multi-resolution versions of the current and reference pictures. They also require multiple accesses to external memory to store and retrieve the different resolutions of the reference picture.

It is an object of the techniques disclosed herein to overcome the foregoing problems of motion estimation by providing ways of locating a predictor block for a current block which are particularly well-adapted to use in encoding systems that require efficient use of memory.

SUMMARY OF THE INVENTION

The object is attained by taking motion vectors from blocks that are proximate to the current block, applying the motion vectors to the current block to locate candidate blocks in a reference picture, and then using the candidate blocks to define a portion of the search space. The search space that is so defined is generally small enough to be loaded in its entirety into the internal RAM of the processor used to do the block comparison, but is not limited to a simple projection of the internal RAM of the processor onto external memory.

Other aspects of the invention include improved techniques for limiting the search for the predictor, using a non-rectangular search space centered on a current best candidate to further refine the search for the predictor block, dynamically varying the number and locations of the proximate blocks whose motion vectors are used to locate the candidate blocks as dictated by the availability of motion vectors for the proximate blocks, by the availability of processor cycles, and by the values of previously-determined motion vectors.

Still other objects and advantages of the invention will be apparent to those skilled in the arts to which the invention pertains upon perusing the following Detailed Description and Drawing, wherein:

Figure 1:
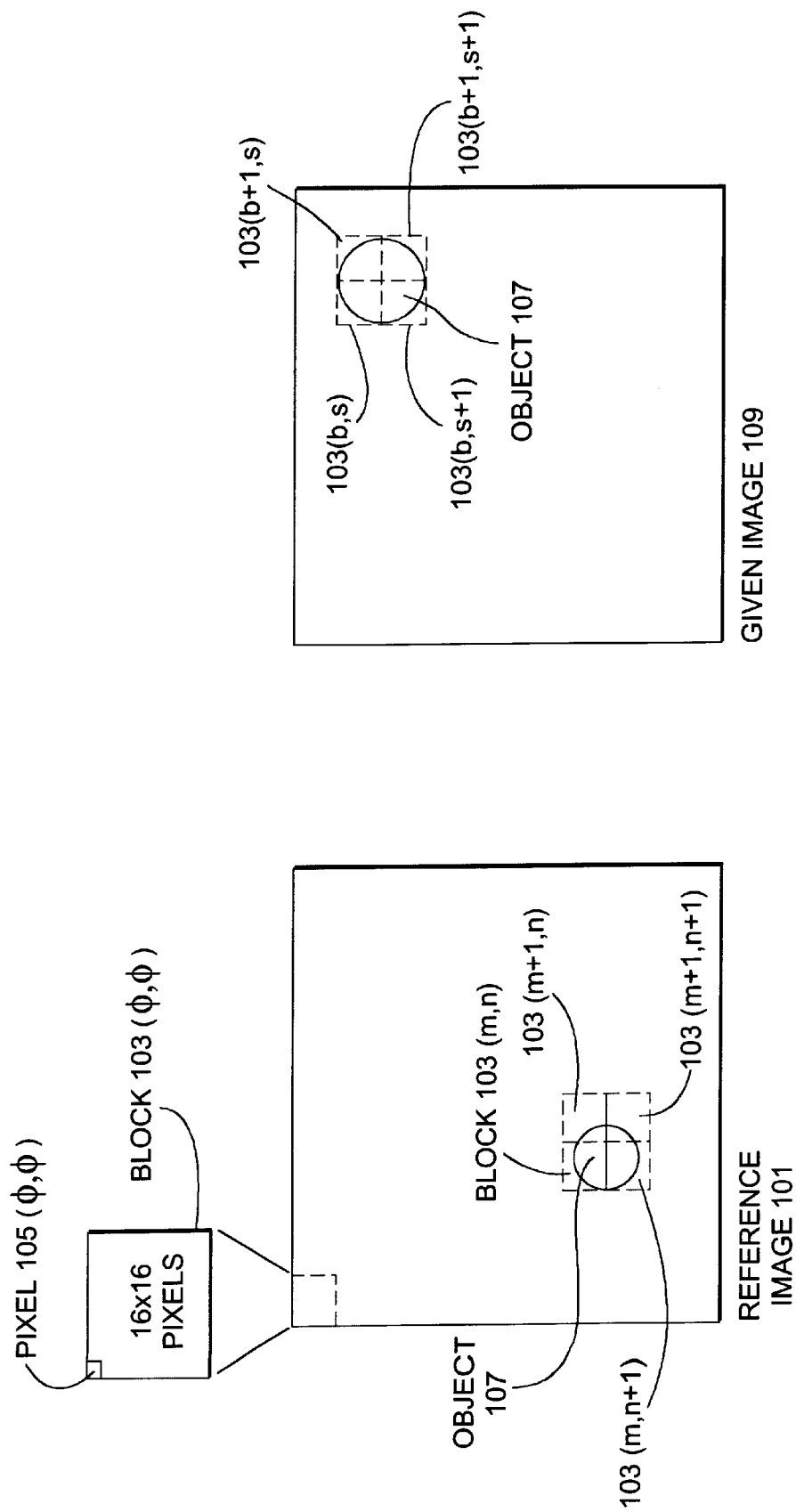
FIG. 1 is a drawing which provides an overview of digital picture encoding.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The following Detailed Description first describes how candidate blocks are selected in a preferred embodiment and then shows how candidate blocks selected according to the techniques may be used to predict the search space required for the new techniques.

Figure 2:
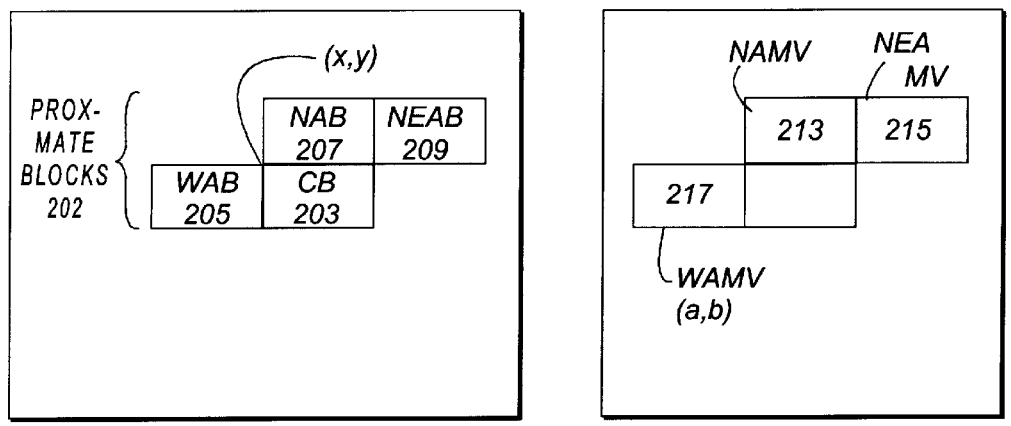
FIG. 2 is a drawing which shows proximate blocks and candidate blocks used in a preferred embodiment.
Figure 2:
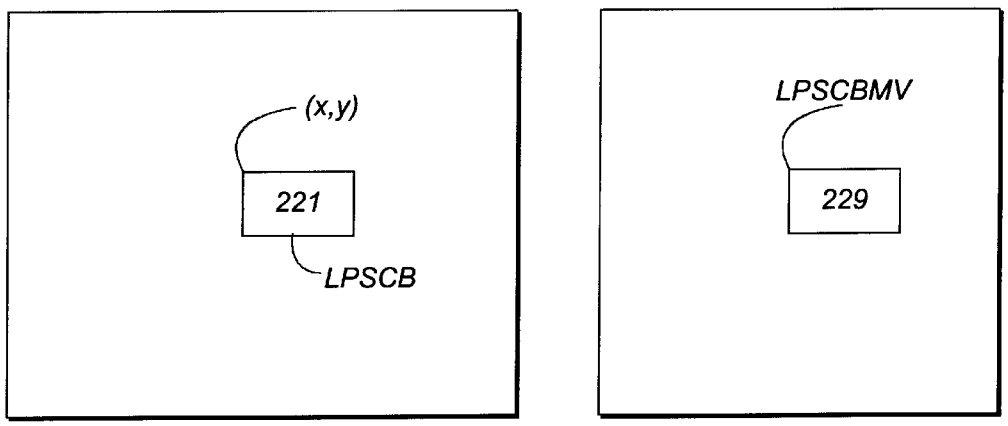
Figure 2:
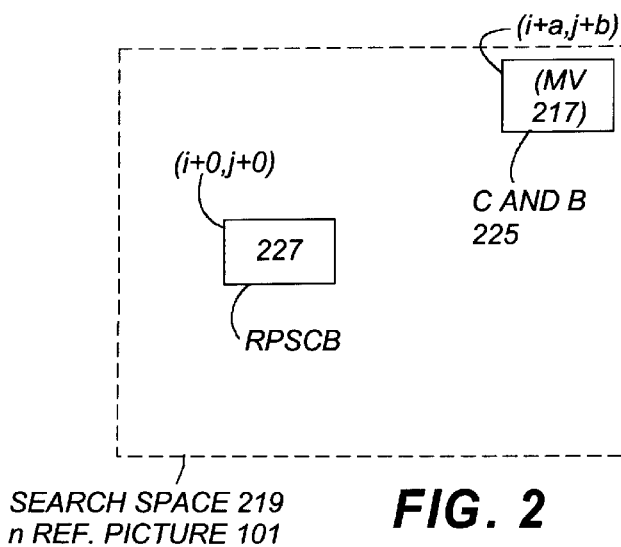

A Preferred Embodiment of the Techniques: FIG. 2

In a preferred embodiment, the techniques just described are employed in a two-phase search for the predictor for the current block. The first phase localizes the area in which the predictor will be searched for and the second phase refines the search within a predefined 2-dimensional search space whose shape is predefined or determined by the results of the first phase. The search terminates in either phase as soon as a suitable predictor has been found. The first phase uses the location of four or more proximate blocks and the current block to locate corresponding candidate blocks in a reference picture. The proximate blocks have two properties:

they are in particularly close proximity to the current block; and if the proximate block has a motion vector, it has already been computed.

If a candidate block is found which matches the current block closely enough to be considered the predictor for the current block, the search ends in the first phase; if such a candidate block is not found, the search continues using candidate blocks in the reference picture in a sequence that forms a gradually expanding spiral around the best candidate found in the first phase. The search ends either when a match is found that is close enough or when all of the candidate blocks in the search space of the second phase have been compared with the current block. When looked at simultaneously, in a preferred embodiment, the candidate blocks form a diamond shape with the best candidate from the first phase at the center of the diamond. An advantage of the use of proximate blocks to locate the candidate blocks is that the motion vectors for the proximate blocks used in the first phase are known prior to the beginning of the first phase; consequently, they can be used to determine the search space for the first phase and the search space can be preloaded into the DSP's internal DRAM prior to the beginning of the first phase. Moreover, because the best candidate block to be provided by the first phase is both in the search space for the first phase and is used as the center of a diamond shape of predetermined size for the second phase, the search space for the first phase can be expanded to a larger rectangular search space that encompasses a diamond shape centered on any of the blocks in the search space and the expanded search space can be preloaded into the DSP's internal DRAM prior to the first phase.

Figure 6:
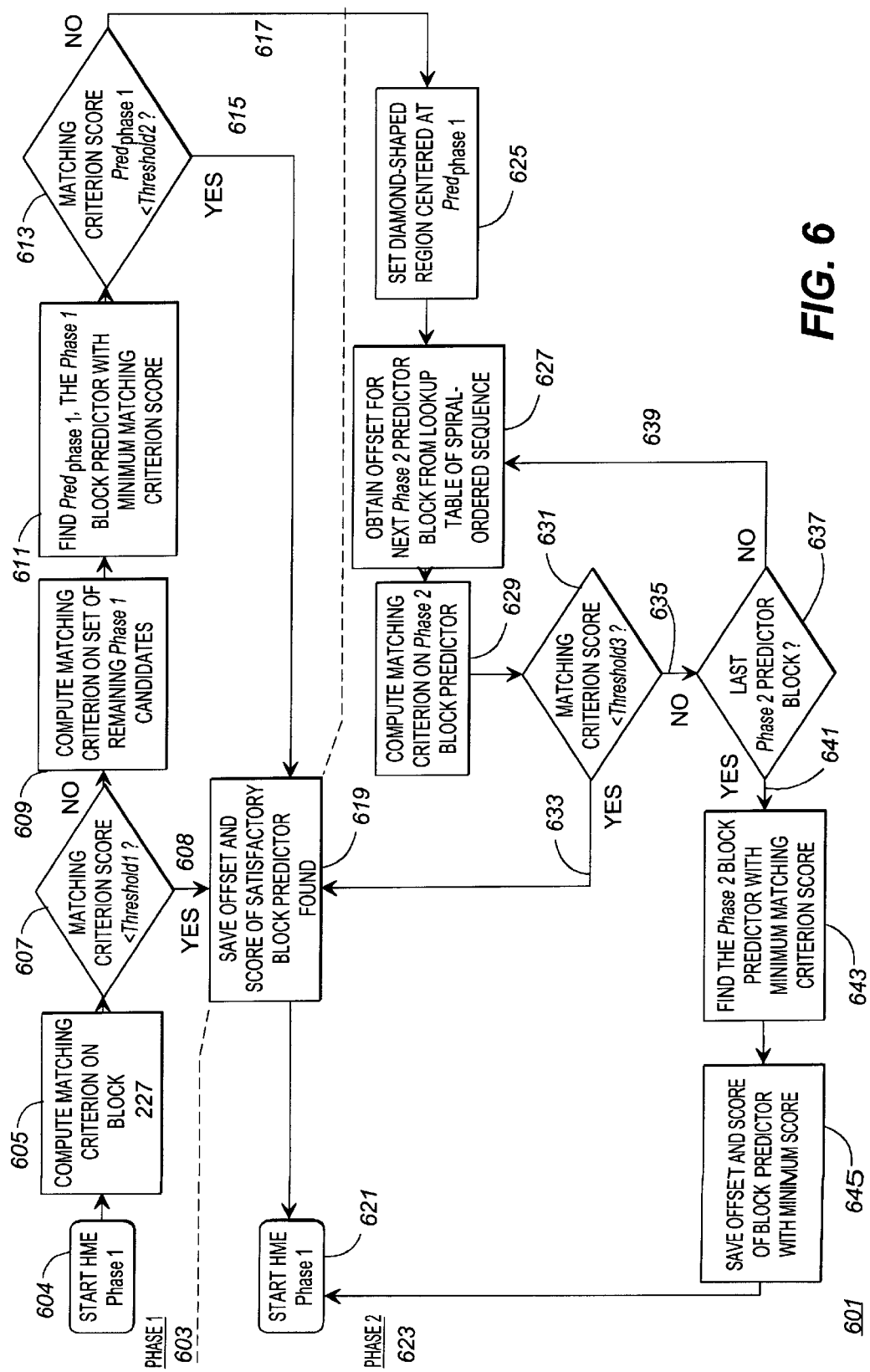
FIG. 6 is a flowchart of a preferred embodiment of the HME method.

Phase 1: FIGS. 2 and 6

FIG. 2 shows the proximate blocks 202 that are first considered for the first phase of the search. As will be described in detail below, more proximate blocks may be employed or others may be substituted for the proximate blocks of FIG. 2. Current block 203 and proximate blocks 202 are used to find a predictor for current block 203 of current picture 201 in search space 219 of reference picture 101. In the preferred embodiment, encoding of current picture 201 is done in raster-scan order, that is, the blocks of the current picture are encoded in rows, with the blocks in each row being encoded from left to right and the rows being processed from top to bottom of the picture. Thus, blocks in rows above the row containing the current block have already been encoded, as have blocks to the left of the current block in the current block's row. Since these blocks have already been encoded, any motion vectors they may have are already available. In the preferred embodiment, five candidate blocks are found using a minimum of four proximate blocks and the current block. The four proximate blocks first considered for use in the first phase are one block of last picture to be encoded 220 and three blocks of current picture 201. The one block of last picture to be encoded 220 has the same x and y coordinates in picture 220 that the current block has in current picture 201. A block in a different picture that has the same coordinates as the current block is termed herein a spatially corresponding block. The three proximate blocks in current picture 201 are the three blocks that are adjacent to current block 203 and may already have motion vectors. Adjacent here means having at least a corner that touches an edge or corner of the current block. The blocks used to locate the five candidate blocks are thus the following:

1. Current Block (CB) 203, used to locate Reference Picture Spatially Corresponding Block (RPSCB) 227, the block in reference picture 101 that has the same x and y coordinates as current block 203, or put another way, the block in reference picture 101 for which current block 203 has the motion vector (0,0);
2. Last Picture Spatially Corresponding Block (LPSCB) 221 in last encoded picture 220 that has the same x and y coordinates as current block 203;
3. West Adjacent Block (WAB) 205 in the current picture;
4. North Adjacent Block (NAB) 207; and
5. Northeast Adjacent Block (NEAB) 209.

In the preferred embodiment, current picture 201 and last picture encoded 220 each have an associated look up table that has an entry for each block in the picture. If a motion vector has been calculated for the block, the entry for the block contains the block's motion vector. If no motion vector has been calculated, the entry contains null values. For instance, in FIG. 2, current picture 201 has a look up table 210, and in table 210 are entries for the motion vectors for proximate blocks 202. Entry 213 has the motion vector for proximate block 207. This is the North Adjacent Motion Vector (NAMV). Entry 215 has the motion vector for proximate block 209. This is the Northeast Adjacent Motion Vector (NEAMV). Entry 217 has the motion vector for proximate block 205. This is the West Adjacent Motion Vector (WAMV). Similarly, in look up table 218 for last encoded picture 220, there is a motion vector entry 229 for proximate block 221. This is the LPSCB Motion Vector (LPSCBMV).

The motion vectors for the above five proximate blocks are used to locate five candidate blocks in reference picture 101. One of the candidate blocks is RPSCB block 227 in reference picture 101; the other four are located by applying the motion vector for one of the proximate blocks in current picture 201 or last picture encoded 220 to the x and y coordinates (i,j) of block 227 in reference picture 101. Thus, candidate block 225 is located using motion vector (a,b) 217 from proximate block 205 by applying motion vector (a,b) to coordinates (i,j) to obtain coordinates (i+a,j+b) for candidate block 225. The block in current picture 201 with motion vector (0,0) relative to block 227 is of course current block 203. The five candidate blocks can thus be described as follows:

1. RPSCB block 227 of reference picture 101;
2. the candidate block at the offset found by applying motion vector 217 to the coordinates (i,j) of RPSCB 227;
3. the candidate block at the offset found by applying motion vector 213 to the coordinates (i,j);
4. the candidate block at the offset found by applying motion vector 215 to the coordinates (i,j); and
5. the candidate block at the offset found by applying motion vector 229 to the coordinates (i,j).

The motion vector of current block 203 with regard to RPSCB 227 is of course (0,0), and current block 203 will match RPSCB 227 if there has been in fact very little or no motion of current block 203 with regard to RPSCB 227.

Details for the foregoing may be found in FIG. 6, which is a flow chart 601 for both phases of a preferred embodiment of the hybrid motion estimation technique. The technique involves three threshold values whose derivation will be explained below. In the immediately following discussion, we will be concerned only with Phase 1 603. In the discussion, reference numbers in parentheses indicate blocks in flow chart 601. Beginning with START HME 604, the first step is to test for motion of current block 203 relative to RPSCB 227 by comparing current block 203 with RPSCB 227 (605). If the comparison shows a match between current block 203 and RPSCB 227 such that the matching criterion is below a first threshold, there is a very high probability that there has been very little or no motion with regard to current block 203 between the current picture and reference picture 101 (607). In this case, RPSCB 227 is the predictor for current block 203 and there is no need to examine other candidates. Thus, as shown by arrow 608, the method immediately goes to step 619 and then exits at 621.

If the matching criterion is not below the first threshold, the motion vectors for the four remaining proximate blocks 205, 207, 209, and 221 are used to locate candidate blocks 225 in search space 219 (609). Each candidate block 225 is then compared with current block 203 as described above, and the best-matching block, that is, the one with the lowest matching criterion score, is selected as the predictor (611). If this predictor has a matching criterion score which is less than a second threshold (613), it is selected as the predictor for current block 203 and as shown by arrow 615, the method exits via block 619 to 621, as described above. Otherwise, the method continues with Phase 2 623 (arrow 617), which will be described in more detail below.

Locating a Candidate Block from LPSCB 221

Last encoded picture 220 does not necessarily have to be the reference picture. For example, when consecutive bi-directional (B type) pictures are transmitted in the MPEG video coding standard, the last encoded picture may be a B picture and therefore not a reference picture. Also, the last encoded picture does not necessarily have to be a picture that will be displayed prior to the current picture. For example, in the MPEG video coding standard, a predicted picture (P type) is transmitted prior to a B picture but displayed after the B picture. In this case the P picture is a reference. The MPEG video coding standard is explained in detail in ISO/IEC *International Standard* IS 11172-2, "Information technology—Coding of moving pictures and associated audio for digital storage media at up to about 1.5 Mbits/s— Part 2: Video," 1993 and ITU-T *Recommendation* H.262 (1995): "Generic coding of moving pictures and associated audio: video," (ISO/IEC 13818-2). As explained in detail below, the candidate obtained from proximate block 221 in last picture 220 can be obtained directly from the motion vector of block 221 or computed by proportionally scaling in the temporal domain the X and Y coordinates of that motion vector.

Computation of Candidate Block offset from Motion Vector in last Encoded Picture The following discussion will first describe the temporal relationships between pictures that are possible in sequences of encoded video images and will then describe how these temporal relationships affect the computation of the motion vector used to determine the candidate block 225 for which LPSCB 221 is the proximate block.

A digital video sequence originates at a camera where a scene is captured as consecutive pictures of fields (interlaced pictures) or frames (progressive pictures). Pictures are captured by the camera at a specified picture rate. For instance, an NTSC camera captures fields at approximately 60 Hertz. If the pictures from a camera are in analog format, they are digitized and spatially scaled to the required spatial resolution by the encoder engine. Once in digital format, a temporal reference is associated with each picture to keep track of the time that it was captured in relation to other pictures and therefore facilitate the maintenance of their display order. Hence, a typical sequence of pictures generated by a camera is represented by: $P_1, P_2, P_3, P_4, P_5, \ldots P_k$, where the subscript signifies the display order of the pictures.

Since real-time cost-effective encoder engines in multimedia systems such as those for video-phone applications, have limited processing power, the encoder engine may encode pictures at a slower rate than the rate at which the camera outputs pictures. Furthermore, the rate control component of the encoder engine may dynamically abstain from encoding pictures according to its computational load or the fullness of its output buffer. Consequently, the actual set of pictures from a picture sequence that undergo compression and transmission may have gaps corresponding to the pictures that the encoder engine had to discard. For example, a compressed picture sequence could potentially be: $P_1, P_5, P_8, P_{11}, P_{14}, \ldots P_k$ because:

1. the encoder engine is designed (or intended) to operate at 10 pictures per second, and
2. the first picture of a sequence overflows the output buffer since it does not benefit from the superior data reduction capabilities offered by motion estimation.

That is, in this example, the encoder engine is designed to compress every third picture but because $P_1$ results in a large number of bits in compressed form, the encoder engine has to disregard $P_2$ through $P_4$. Then by the time that $P_5$ arrives, the encoder engine's output buffer is sufficiently drained to allow compression of $P_5$.

Further, in many encoding schemes, not every encoded picture is a reference picture. In these schemes, such encoded non-reference pictures are inserted between the reference pictures. Such schemes enable temporal picture scalability (i.e., picture dropping) by a compliant decoder engines of less computational power and/or allow random access in compressed digital video streams. Finally, the order in which pictures are encoded may differ from their display order. An example here is MPEG, which attains more efficient compression of high motion video sequences by permitting a picture to refer to a future reference picture. The order in which the encoder engine encodes pictures is the picture transmission order.

The following cases will exemplify the computation of the displacement of the candidate block from the motion vector of the spatially corresponding block in the last encoded picture. This computation is based on:

1. the coordinates of the contributed motion vector, (x, y), and
2. the temporal relationship between:
   the reference picture,
   the last encoded picture, and
   the current picture.

All pictures are assumed to be part of a sequence presented to the encoder engine with display order: $P_a, P_b, P_c, P_d, P_e, \ldots P_i P_j, P_k, \ldots$, in which the temporal relationship implies that a<b <c<d<e<. . . I<j<k . . . and so on. For generalizing the following description, we employ the subscripts: k, m, and v, with the display order condition: k<m<v, but without any constraints in the temporal disparity (i.e., how much temporal separation exists) between the pictures.

In all of the following cases, if the computed displacement, (newX, newY), results in a candidate block with any part of its area protruding beyond the boundaries of the permitted search space (i.e., outside the allowed motion vector range), the candidate block is disregarded or substituted by another eligible candidate block as explained below under Boundary Conditions.

In each respective case below, the computation is applicable only to the third compressed picture (i.e., the third picture in the transmission order) since two temporal relationships of previously transmitted pictures are required.

Case 1—display order=transmission order; last encoded picture is also "past" reference picture

| | |
|---|---|
| Pictures in display order: | $P_k, P_m, P_v,$ |
| Transmission order of picture - current picture: | $P_k, P_m, P_v,$ (same as display order) |
| Last encoded picture prior to current picture: | —, $P_k, P_m,$ |
| Reference Picture for current picture: | —, $P_k, P_m,$ |

Then for picture $P_v$:

$$newX = floor\left(X\left(\frac{v-m}{m-k}\right)+0.5\right) \quad newY = floor\left(Y\left(\frac{v-m}{m-k}\right)+0.5\right)$$

Where 0.5 is added to round-off to the nearest integer prior to truncation as implied by the floor function . This case is typical in H.261 and H.263 video coding. For details, see ITU-T Recommendation H.261 (1993): "Video codec for audiovisual services at p×64 kbits/s" and Draft ITU-TRecommendation H.263 (199?): "Video codec for low bitrate communications."

Case 2—display order=transmission order;

last encoded picture and current picture use same "past" reference picture

| | |
|---|---|
| Pictures in display order: | $P_k$, $P_m$, $P_v$, |
| Transmission order of picture - current picture: | $P_k$, $P_m$, $P_v$, (same as display order) |
| Last encoded picture prior to current picture: | →, $P_k$, $P_m$, |
| Reference Picture for current picture: | →, $P_k$, $P_k$, |

Then for picture $P_v$:

$$newX = floor\left(X\left(\frac{v-k}{m-k}\right)+0.5\right) \quad newY = floor\left(Y\left(\frac{v-k}{m-k}\right)+0.5\right)$$

Where permissible by the specification and syntax of a video encoder engine, this case allows a compliant decoder engine to drop either $P_m$ or $P_v$ for downward temporal scalability.

Case 3—display and transmission order differ;

last encoded picture and current picture use same "future" reference picture

| | |
|---|---|
| Pictures in display order: | $P_k$, $P_m$, $P_v$, |
| Transmission order of picture - current picture: | $P_v$, $P_k$, $P_m$, |
| Last encoded picture prior to current picture: | →, $P_v$, $P_k$, |
| Reference Picture for current picture: | →, $P_v$, $P_v$, |

Then for picture $P_m$:

$$newX = floor\left(X\left(\frac{v-m}{v-k}\right)+0.5\right) \quad newY = floor\left(Y\left(\frac{v-m}{v-k}\right)+0.5\right)$$

Where permissible by the specification and syntax of a video encoder engine, this case is useful for compressing high motion video that exhibits scene changes.

Case 4—display and transmission order differ;

last encoded picture is also reference picture, except that Pk is a "past" reference picture to $P_v$ and $P_v$ is a "future" reference picture to $P_m$

| | |
|---|---|
| Pictures in display order: | $P_k$, $P_m$, $P_v$, |
| Transmission order of picture - current picture: | $P_k$, $P_v$, $P_m$, |
| Last encoded picture prior to current picture: | →, $P_k$, $P_v$, |
| Reference Picture for current picture: | →, $P_k$, $P_v$, |

Then for picture $P_m$:

$$newX = floor\left(X\left(\frac{m-v}{v-k}\right)+0.5\right) \quad newY = floor\left(Y\left(\frac{m-v}{v-k}\right)+0.5\right)$$

Where permissible by the specification and syntax of a video encoder engine, this case allows a compliant decoder engine to drop either $P_m$ or both $P_m$ and $P_v$ for downward temporal scalability.

Case 5—display and transmission order differ;

last encoded picture is also reference picture, except that $P_v$ is a "future" reference picture to $P_k$, and $P_k$ is a "past" reference picture to $P_m$

| | |
|---|---|
| Pictures in display order: | $P_k$, $P_m$, $P_v$, |
| Transmission order of picture - current picture: | $P_v$, $P_k$, $P_m$, |
| Last encoded picture prior to current picture: | →, $P_v$, $P_k$, |
| Reference Picture for current picture: | →, $P_v$, $P_k$, |

Then for picture $P_m$:

$$newX = floor\left(X\left(\frac{k-m}{v-k}\right)+0.5\right) \quad newY = floor\left(Y\left(\frac{k-m}{v-k}\right)+0.5\right)$$

Figure 3:
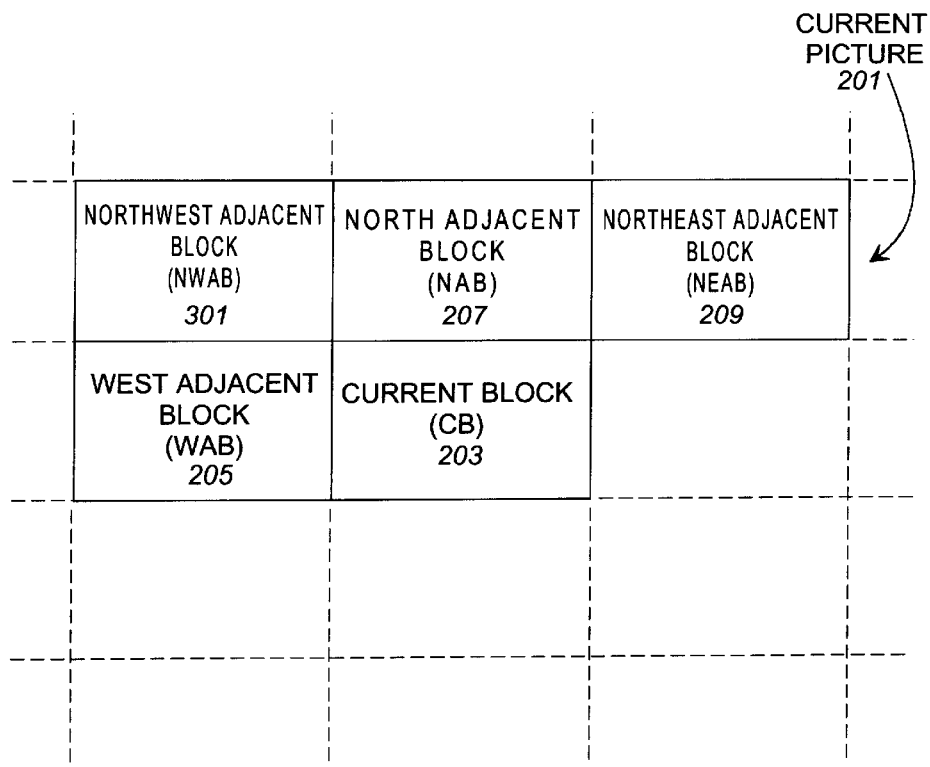
FIG. 3 is a drawing showing proximate blocks in the current picture.
Figure 4:
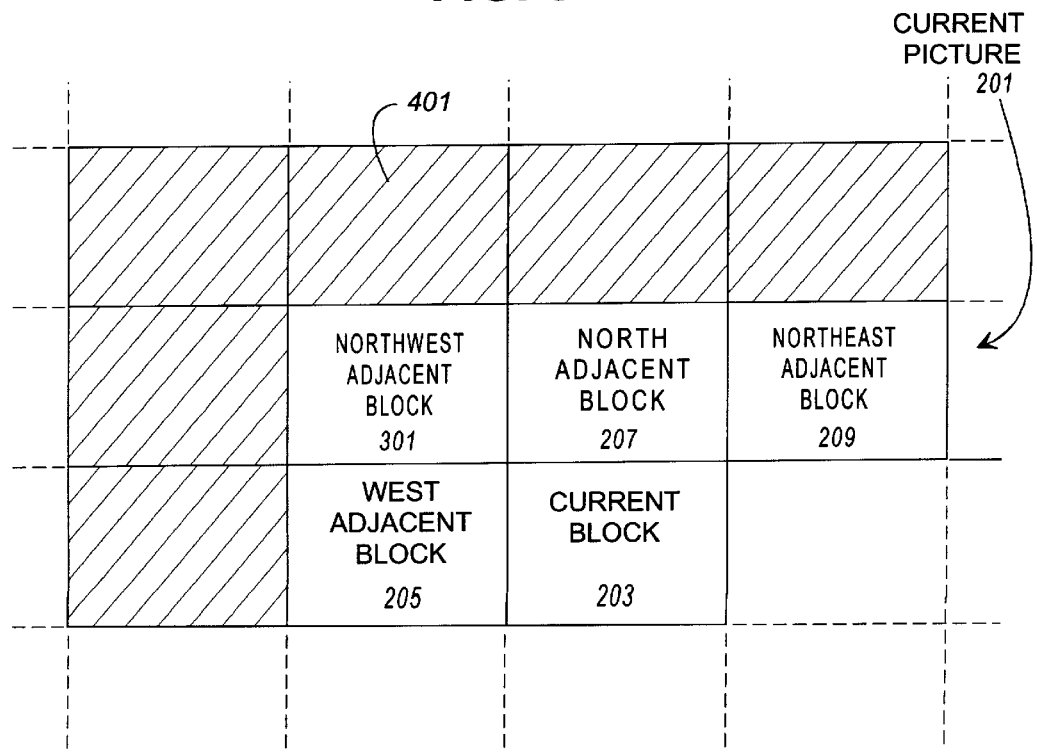
FIG. 4 is a drawing showing additional proximate blocks in the current picture.

Using other Proximate Blocks in Phase 1: FIGS. 3 and 4

As shown in FIG. 3, northwest adjacent block 301 can be used in Phase 1 to locate a candidate block 225 in the same fashion as the other proximate blocks 202. Block 301 can be used either to locate a sixth candidate block or in place of one of proximate blocks 205, 207, or 209. In the latter case, the encoder engine keeps a record of which adjacent block provided the motion vector for the predictor for each block in current picture 201 whose motion vector has been determined and uses this information to determine which three of the four adjacent blocks (northwest, north, northeast, west) should be used to contribute their motion vectors as predictors for the current block. The northwest block also serves as a replacement when one of the other blocks 205, 207, or 209 does not exist in the picture (that is, towards the right-most part of the picture) or when a motion vector does not exist for one (or more) of the other three adjacent blocks because of unsatisfactory motion estimation performance (i.e., the best matching error found was not acceptable).

The set of proximate blocks 202 used during Phase 1 of the hybrid motion estimation (HME) method is further not limited to blocks 227, 221, 205, 207, 209, and 301. As shown in FIG. 4, additional candidates 225 can be obtained by using motion vectors from proximate blocks in the current picture where motion estimation has already been performed. Some of these additional proximate blocks appear as the six blocks in shaded area 401 of FIG. 4. The bound on the number of proximate blocks that can be used in Phase 1 of the HME method is imposed by the computational power of the DSP-based encoding engine and by the need to reserve processor cycles for the block matching computations of Phase 2 of the HME. The closer a proximate block is to the current block, the more likely that it will exhibit similar translational motion. Hence, the preferred additional proximate blocks are those adjacent to the west, northwest, north and northeast blocks. These additional blocks are shown as shaded area 401. The shaded blocks can be used as proximate blocks in Phase 1 of the HME method when the encoder engine has surplus processor cycles or when any of the proximate blocks already being used in Phase 1 cannot supply a candidate block.

Figure 5:
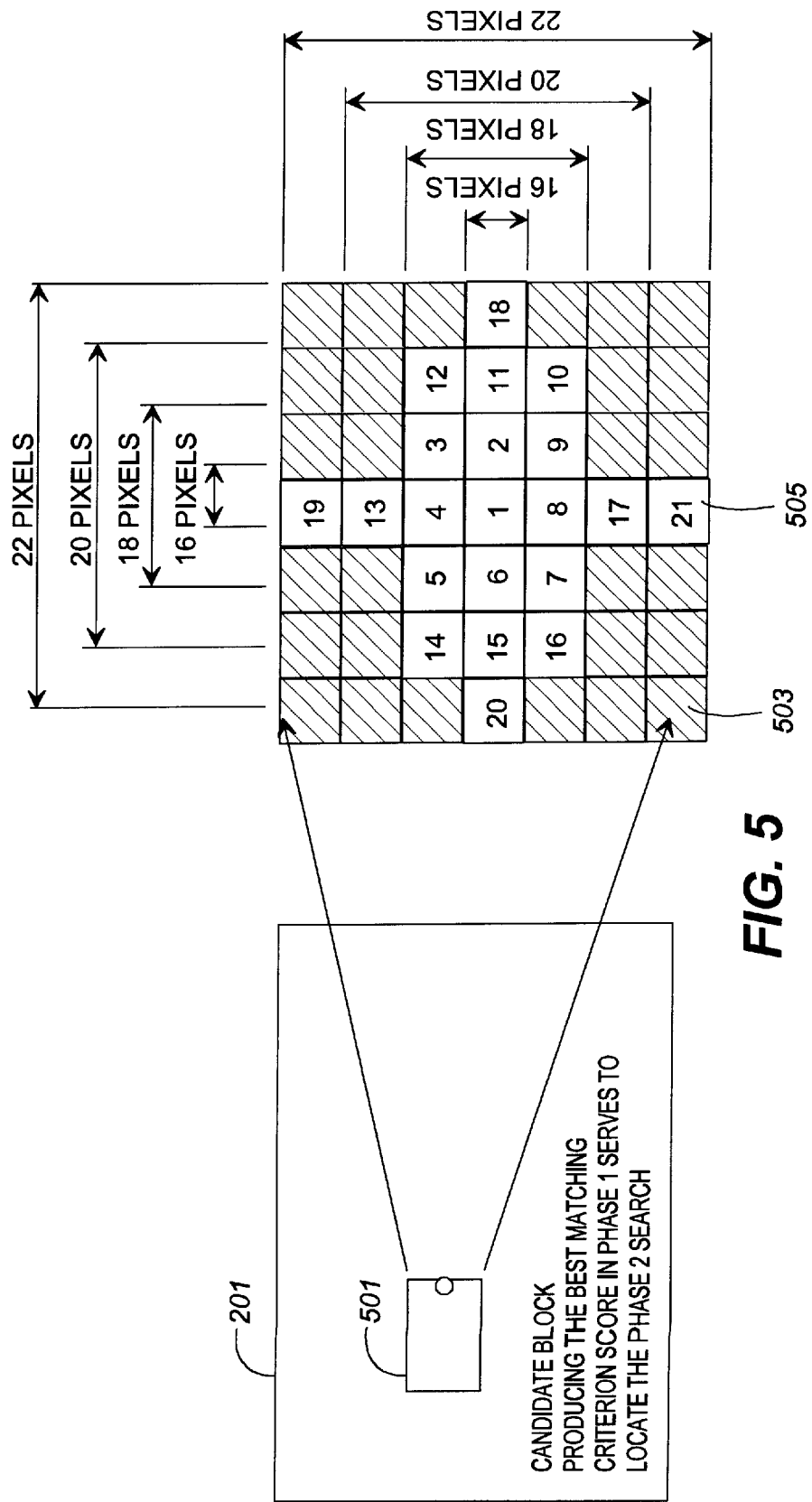
FIG. 5 is a drawing showing candidate blocks in the second phase of the HME method.

Phase 2 of Hybrid Motion Estimation: FIGS. 5 and 6

In the event that the best matching criterion score found in Phase 1 exceeds Threshold2, it is assumed that there may be a better match to the current block elsewhere in the search space. Therefore, the hybrid motion estimation method continues to Phase 2 where a search for a more satisfactory predictor is conducted in a region centered around the predictor located by Phase 1, termed herein Predphase 1.

The HME method proceeds to Phase 2 under the assumption that a better predictor to the current block lies in close proximity to the location of Predphase1. For low bandwidth applications such as video-phone systems, the HME method conducts a search for a better candidate block on a diamond-shaped region or area 505 (rather than a rectangular one). FIG. 5 shows this region 505, comprised of the blocks numbered "1" through "21" and its relationship to Predphase1 501 in search space 201. In FIG. 5, the center of the search area, shown as the block with the number "1," represents 16×16 Predphase 1 block 501. However, for the purpose of simplifying the depiction of the spiral-ordered search, the remaining blocks are also shown as the same size as the 16×16 center block when in actuality they are one-pixel displacements away from the center. As shown by the dimensions in FIG. 5, all blocks except the center block represent a one-pixel displacement rather than a 16×16 block.

Even when a rectangular region 503 is centered at Predphase1 during Phase 2, the candidate block that produces the best matching criterion score tends to be found within the diamond-shaped area 505 bounded by the rectangular region 503. Consequently, the HME method saves additional computation by omitting candidate blocks with displacements outside the diamond-shaped region. The saved computation is then used to enlarge the diamond-shaped region and that in turn enables consideration of additional candidate blocks that can potentially result in a better matching criterion score. Furthermore, the diamond-shaped region is designed to consider more horizontal candidate displacements than vertical positions, as shown in FIG. 5, because typical consumer video-phone pictures in the home tend to exhibit a horizontal-like motion due to camera panning (i.e., panning to capture members of the family in the living room).

In Phase 2 of the HME Method, the spiral search within the diamond-shaped region is preferably conducted in a specific order as indicated by the increasing number label of the block to further minimize computation. The closer a candidate block is to Predphase1 501, the more likely it is to have a matching criterion score that is better than the score at Predphase1 501. Hence, candidate blocks are considered in a counterclockwise (or alternatively clockwise) spiral outward order (away from Predphase1 501 ).

The method used to locate a predictor better than Predphase1 501 is shown in Phase 2 623 in FIG. 6. At 625, diamond-shaped region 505 is set up; then a loop consisting of blocks 627, 629, 631, and 637 is executed until either a candidate has been found whose matching criterion score for the match with current block 629 is sufficiently low, that is, in the preferred embodiment, less than threshold 3, or until all of the candidates in diamond 505 have been examined. In the former case (block 631 and arrow 633), the candidate block is the predictor and the method terminates via 619 and 621; in the later (block 637 and arrow 641, the Phase 2 candidate block with the minimum score on the matching criterion is the predictor and the method terminates via blocks 643, 645, and 621.

Since diamond 505 is centered on Predphase1 501, it may be implemented by a lookup table of the displacements of blocks 2–21 from Predphase1 501, and the addresses of the candidates examined during Phase 2 may be computed using this lookup table. Although the shaded area of rectangle 503 outside the diamond-shaped region in FIG. 2 is not used during Phase 2, for practical reasons, the effective area that must be in DSP Data RAM for execution of Phase 2 is the complete 22×22 rectangular region 503 (484 bytes). The effective area required beyond the 16×16 block is an extension of three pixels in each direction. This Delta is incorporated in the calculation of the required search space area for Phase 1 that is described below. Alternatively, this data transfer can be dispatched immediately after Predphase1 501 is determined during Phase 1. In differentiation to fast motion estimation methods (discussed above) that use a sequence of steps to home in on the final result, an additional novelty of the HME method employs a non-rectangular-shaped search area that is mapped on the target (Predphase1) and a spiral ordered search within this reduced search area.

Alternative Modes of Operation for Phase 2

The search area for Phase 2 of the HME method is not limited to the specified region size or shape shown in FIG. 2 but can be increased with additional displacements in the case of more powerful processors and/or surplus DSP Data RAM.

Since the number of processor cycles expended with the HME method varies depending on how quickly a satisfactory predictor is found, in an alternative mode of operation of this invention the size of the Phase 2 search space region is dynamically altered based on the surplus processor cycles.

In another alternative mode of operation, the shape of the region is dynamically selected from a set of pre-defined shapes or customized based on:

1. the location of Predphase1 501 relative to the current block along with the relative location of the block contributing the motion vector for Predphase1 501; or
2. the general orientation of the set of candidate blocks in Phase 1 relative to the current block.

Therefore, if the general orientation of the set of candidate blocks has a much larger Y-component than a X-component, a vertically-biased diamond-shaped region is used. Hence, an additional feature of this invention is that the skew and orientation of the diamond-shaped region can be dynamically adjusted. However, preferable to dynamically calculating the shape of the Phase 2 search space region is a mode of operation that selects a shape and its associated lookup table for the Phase 2 search order from a small set of pre-defined shapes. One particularly usefull set of pre-defined shapes consists of four diamond-shaped entries: one horizontally-biased, another vertically-biased, and two diagonally-biased (one oriented at 45 degrees and the other at 135 degrees).

Determining Threshold1, Threshold2, and Threshold3

In general, Threshold1 Threshold2 Threshold3. One reason for this is that in general, the more cycles a processor expends to find the predictor, the better the match between the predictor and the current block should be. Another is that motion vectors are encoded as differences in magnitude between the magnitude of the motion vector for the current block and the magnitude of the motion vector of a previously encoded block in the current picture as specified by the syntax and the semantic rules required for a compressed video stream. Consequently, the greater the difference in the magnitude, the more bits required to represent the magnitude in the compressed representation of the block.

Each threshold is computed by adding a dynamically-determined $\Delta$ value to a fixed component. In the preferred embodiment, which employs 16×16 blocks and the SAE matching criterion and has a data rate of 112 Kbs, $Threshold1 = 512 + \Delta_1$ $Threshold2 = 512 + \Delta_2$ Threshold3=512 +$\Delta_3$ where $\Delta_1 > \Delta_2 > \Delta_3$. The values of $\Delta$ are determined as follows:

$\Delta_1$: the value is controlled by the encoder's rate control mechanism; for QCIF resolution pictures (that is, 176× 144) at 15 frames per second, it can have a maximum value of 1280.

$\Delta_2$: 0.25($\Delta_1 - \Delta_3$)

$\Delta_3$: f(picture resolution, picture rate, data rate, and DSP cycles), where the value of $\Delta_3$ may range over the interval [0,512].

At the 112 Kbs data rate, Threshold1 may vary over the interval [512,1024].

Boundary Conditions

For some blocks undergoing compression, one or more proximate blocks may not have a usable motion vector. Such cases arise when either the proximate block is outside the boundaries of the current picture or when a motion vector does not exist because of unsatisfactory motion estimation performance (i.e., the best matching error found was not acceptable and the designated block was compressed without motion estimation). A similar situation arises when any part of a candidate block identified by a proximate block falls outside the boundaries of the permitted search space. In all three of these situations, replacement proximate blocks are employed as discussed above and explained in FIGS. 3 and 4.

The following consist of other conditions where candidate blocks are undefined:

The current block is in the first "row of blocks" (i.e., the first slice in MPEG or the first GOB in H.263) of the current picture and the current picture is the first picture where motion estimation is to be done.

The current block is in the first "row of blocks" in a section of the picture dispatched to a processor in a parallel processing environment. That is, the picture is partitioned into sections, each a contiguous set of "rows of blocks," and the encoder engine has multiple processors (e.g., a Texas Instrument DSP TMS320C80) that execute the HME method independently in parallel on each section.

In such cases, the respective undefined motion vector is set to (0,0) or the hybrid motion estimation method performs motion estimation on these blocks using a traditional fast motion estimation method.

Dynamic Calculation of a Required Portion of Search Space 219 for the HME method: FIGS. 7–12

Figure 12:
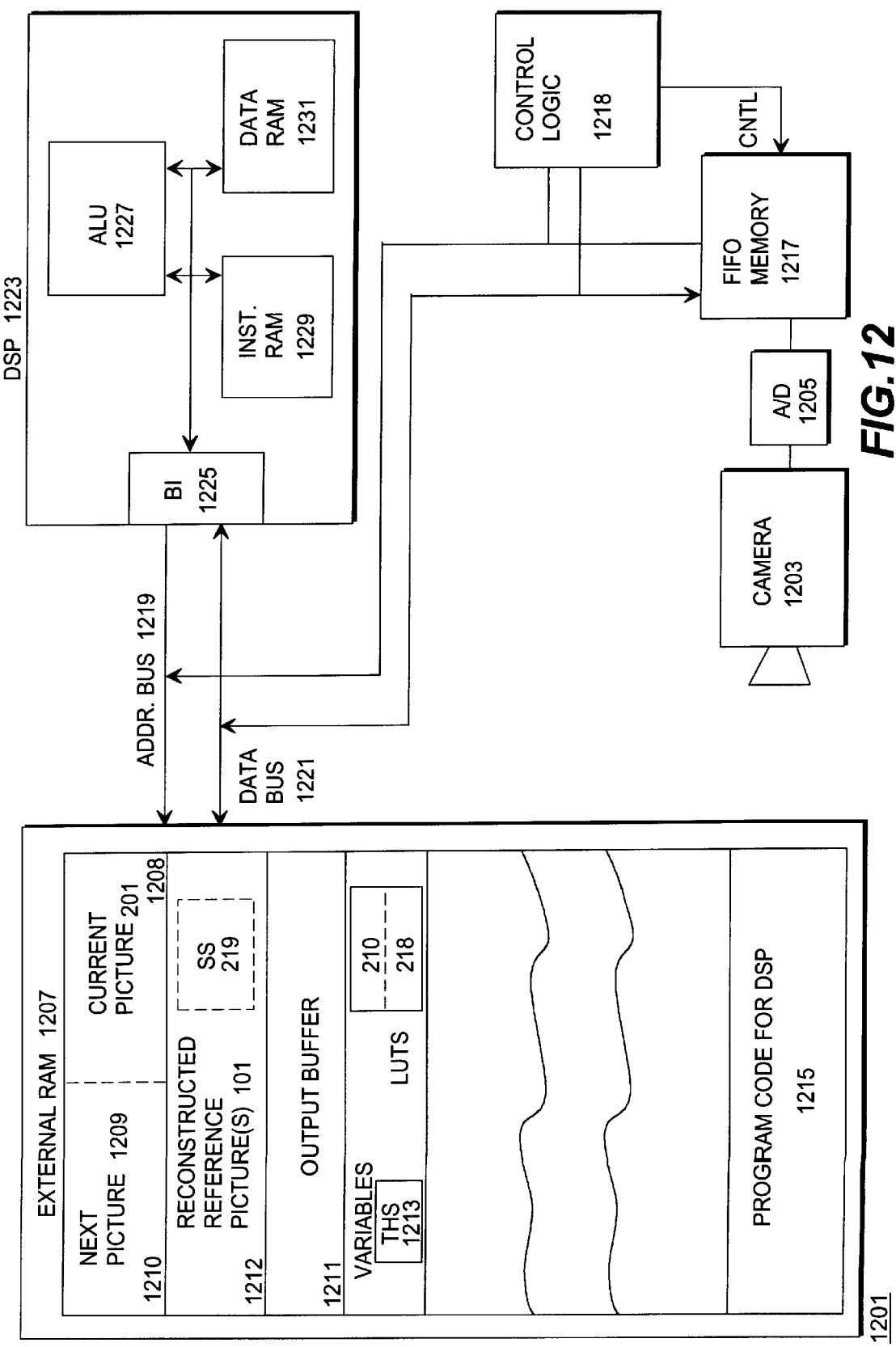
FIG. 12 is a block diagram of the relevant portions of an encoding system in which the preferred embodiment is implemented.

Obviously, the only part of reference picture 101 which need be in the internal RAM of the DSP for Phase 1 of the method 601 is that portion which contains the candidate blocks being used in Phase 1. The locations of the candidate blocks can be computed from the motion vectors of the proximate blocks, and these are known prior to Phase 1. Consequently, the portion of search space 219 that contains the candidate blocks, termed herein the required portion, can be determined prior to Phase 1 and can also be loaded into the internal RAM of the DSP prior to Phase 1. Moreover, the part of the search space required for Phase 2 can also be computed from the locations of the candidate blocks, and consequently, the required portion for both phases may be loaded into the internal RAM FIG. 12 is a block diagram of a video picture encoding system 1201 that shows the relationship between DSP 1223 and the remainder of system 1201. System 1201 receives analog images from a video camera 1203; these are converted to a digital representation in A/D converter 1205 and input to External RAM 1207 by routing digitized picture data via FIFO memory 1217 and controlled by Control Logic 1218, which also coordinates operation of external RAM 1207 and DSP 1223. External RAM 1207 contains two ping-pong picture buffers, 1208 and 1210, one of which always contains current picture 201 currently being encoded and the other of which is receiving the next picture to be encoded 1209 from camera 1203. External RAM 1207 further contains, in buffer 1212, reconstructed representations of the digital reference pictures needed to encode current picture 201. As the current picture is compressed, its decoded representation is reconstructed in 1212. The current picture is destined to be used as a reference picture for the compression of subsequent pictures. The reconstructions in 1212 are made by decoding the encoded digital pictures as they are being encoded. Shown is the reconstructed reference picture 101 with search space 219. The output buffer 1211 receives current picture 201 in its compressed representation as it is encoded and outputs the encoded picture to the remainder of the system. Output buffer can contain portions of the last encoded picture in compressed format that remain to be output.

A further portion of external RAM 1207 contains data used by DSP 1223 in encoding current picture 201; included in this data are the thresholds 1213 used in HME method 601 and the look up tables of motion vectors 210 and 218 for current picture 201 and last picture encoded 220. External RAM 1207 finally contains the program code 1215 which DSP 1223 executes when it performs encoding operations.

DSP 1223 has three main components: DSP hardware 1227, which contains the circuits that actually performs the processing operations, instruction RAM 1229, which contains the portion of DSP program code 1215 that DSP 1223 currently needs for the operations it is performing, and data RAM 1231, which contains the data currently being used or produced by DSP 1223 in the operations it is performing. DSP 1223 is connected via Bus Interface (BI) 1225 to address bus 1219 and data bus 1221, which are in turn connected to external RAM 1207. DSP 1223 can thus read data from RAM 1207 and write data to RAM 1207, but reading from and writing to RAM 1207 are far slower than reading from and writing to data RAM 1231. Consequently, the most efficient way to use DSP 1223 is to load all of the data required for a specific sequence of operations performed by DSP 1223 into data RAM 1231 prior to beginning the sequence of operations. More particularly, efficient use of DSP 1223 to perform HME method 601 requires that current block 203, the required portion of search space 1219, look up tables 210 and 218, and thresholds 1213 be loaded into DSP 1223 prior to beginning HME method 601.

Figure 7:
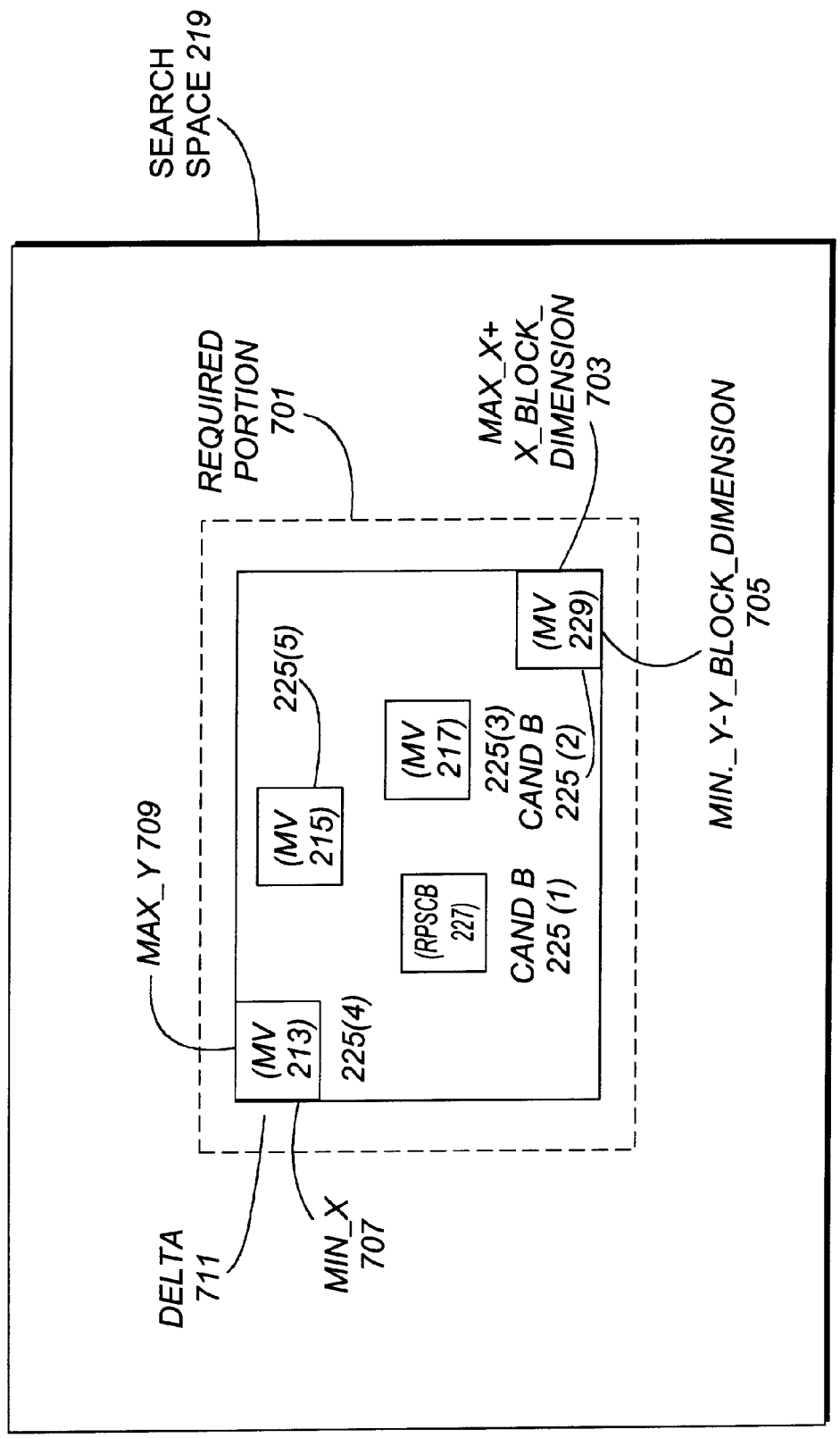
FIG. 7 is a diagram showing a required portion of a search space.

FIG. 7 shows required portion 701 and its relationship to search space 219 and five candidate blocks 225(1 . . . 5). Candidate block 225(1) is block 227 of the reference picture that spatially corresponds to current block 203; the motion vectors used to locate the remaining candidate blocks are written in parentheses in the blocks. The first step in establishing portion 701 is to determine the bounds that are necessary if all of the candidate blocks are to be included in portion 701. Typically, because motion vectors of adjacent blocks are highly correlated, the portion 701 which contains all of the candidate blocks is a single area in search space 219 of reference picture 101 that is sufficiently small to fit into DSP Data RAM. In such a case, which is shown in FIG. 7, only one transfer is required to move required portion 701 from external RAM 1207 to internal data RAM 1231. However, in the event that a calculated search space area is large because of large disparity among the candidate blocks, there may not be a portion 701 that is both a single rectangle and small enough to fit into internal DSP data RAM. In this case, a required portion 701 which is small enough to fit may be made up of two or more non-contiguous and possibly overlapping rectangular sections of search space 219. In this case, each rectangular section must be separately transferred from external memory to internal DSP Data RAM. In the following, a method will be explained which locates two minimal-sized rectangles in search space 219 which contain all of the candidates. In almost all cases, the two minimal-sized rectangles are small enough to fit simultaneously into the DSP's internal RAM.

Figure 8:
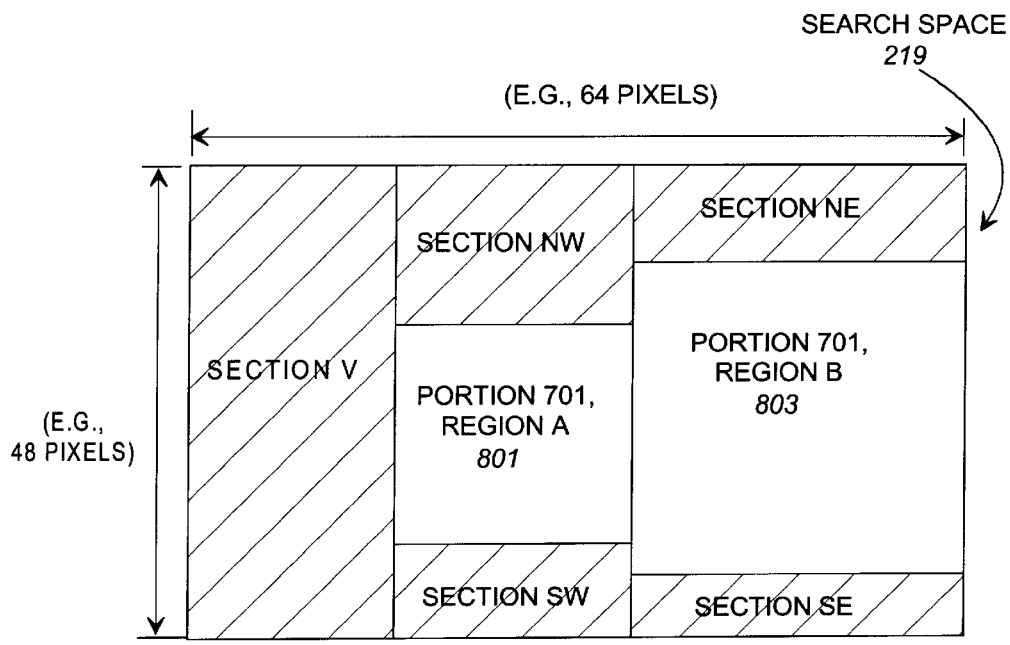
FIG. 8 is a first diagram showing computation of the required portion.

Potential examples of the results of Part 2 of the search space area calculation method are shown in FIGS. 8–11. In FIG. 8, an unused vertical rectangular section of the search space extends from the top to the bottom of the search space. Such section is denoted as Section V. The location of the right side of required rectangular Region A 801 with respect to the left side of required rectangular Region B 803 can vary. The rectangular regions could intersect, be disjoint (i.e., there may be another unused vertical rectangular section between the regions) or have coincident sides as shown. Hence, there could be up to three unused vertical rectangular sections (one to the left of Region A, another in between the regions, and another to the right of Region B). Sections NW, NE, NE, and SE vary in size. Any of Sections NW, NE, NE, and SE may not be present. Candidate block RPSCB 227 will always be encapsulated by one of the two required regions 801 and 803.

Figure 9:
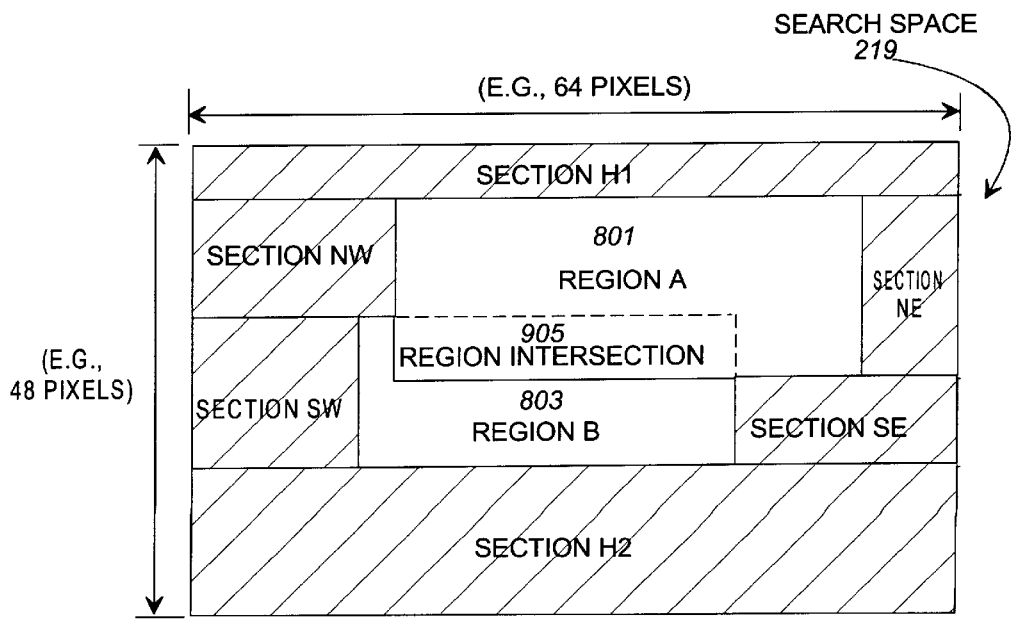
FIG. 9 is a second diagram showing computation of the required portion.
Figure 10:
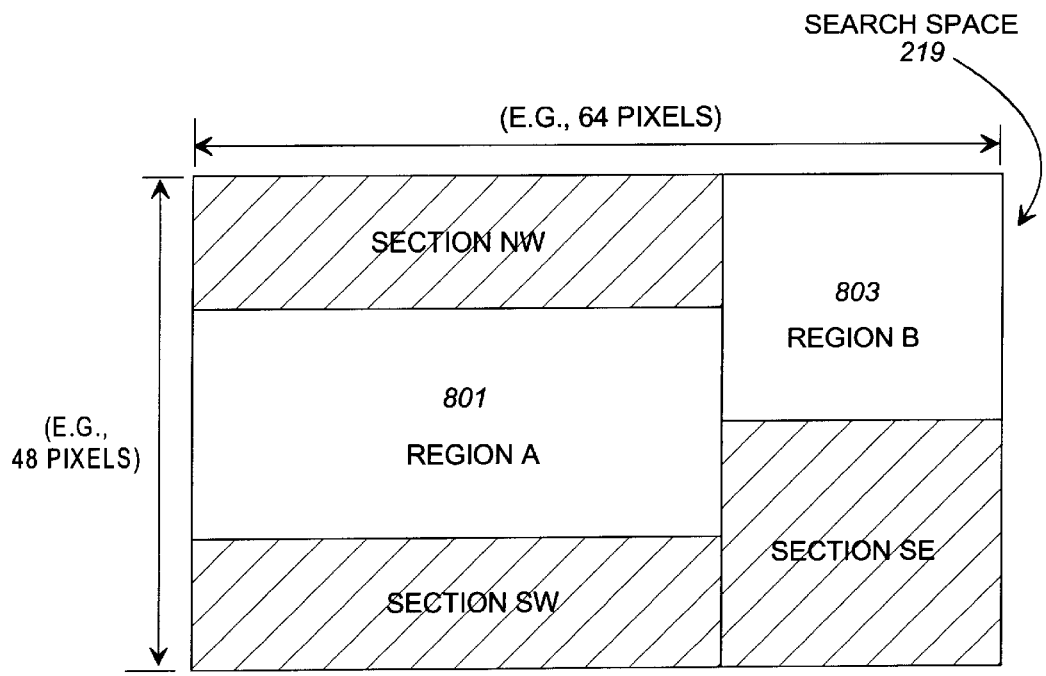
FIG. 10 is a third diagram showing computation of the required portion.
Figure 11:
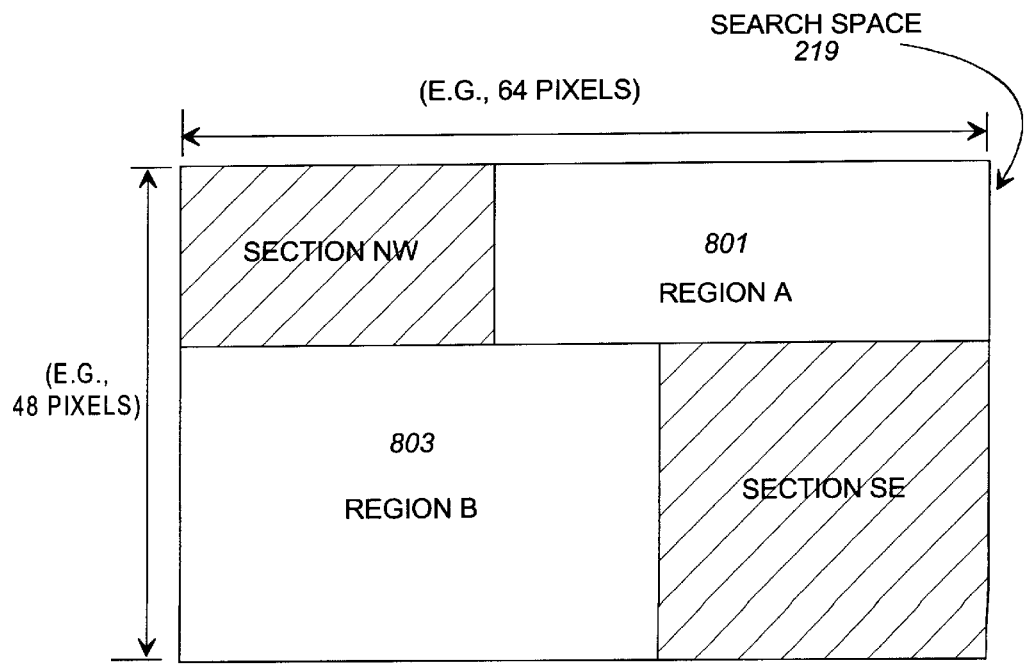
FIG. 11 is a fourth diagram showing computation of the required portion.

Similarly, the calculated search space area may result in one or more unused horizontal rectangular sections. FIG. 9 shows Sections H1 and H2 extending from the left side to the right side of the search space. FIG. 9 also depicts one of the many ways in which required regions 801 and 803 may be related to each other, namely in that they have an intersection 905. Two other ways in which regions 801 and 803 may relate to each other are shown in FIGS. 10 and 11.

Method for Calculating Required Portion 701 of Search Space 219

Required portion 701 is calculated during Phase 1 of the HME method using a technique which first calculates a required portion 701 made up of a single rectangle, and if the single rectangle is too large to fit into the DSP's internal RAM, then calculates a required portion 701 made up of two minimal rectangular required regions 801 and 803.

Part 1—Single Rectangular Area Calculation Method

1. Each Phase 1 candidate block 225 is found and mapped into search space 219. Recall that the coordinates of a candidate block 225 correspond to its top-left corner (i.e., a motion vector points to the pixel in the top-left corner of a block).
2. The extrema of the X-component and the Y-component of the candidates 225 are found.
3. The extent of the rectangular region that bounds the candidates 225 is found using the following set of equations:

new_X_max=min_X−Delta new_X_max=max_X+X_block_dimension+Delta new_Y_min=min_Y−Delta new_Y max=max_Y+Y_block_dimension+Delta FIG. 7 shows how the terms of the equations relate to required portion 701. Delta is an extra amount that is added to required portion 701 to accommodate area 503 used in Phase 2 of the HME method. Delta is appropriately clipped (reduced in value) when necessary so that required portion 701 does not extend outside the boundary of search space 219 or the periphery of reference picture 101. In the preferred embodiment, Delta=3.

4. If the resulting required portion 701 is sufficiently small to fit in internal DSP Data RAM, a request is dispatched to transfer the rectangular region into DSP Data RAM and the method of computing required portion 701 terminates at this point. Otherwise, it continues as indicated below.

Part 2—Candidate Block Clustering Method for Two Rectangular Areas

Part 2 is similar to a statistical clustering method. However, the traditional way of agglomerating a sample to a cluster is based on its distance to the centroids of the clusters; the samples are points and the clusters are represented by their centroid—the average of the cluster's constituents (i.e., the samples). Since our samples are blocks (2-D areas) that must be clustered to a rectangular region, this averaging effect is undesirable because it does not necessarily produce two rectangular areas that sum to the minimal aggregate area of required portion 701.

5. Find the two candidate blocks 225, B1 and B2, that are farthest apart and designate them as the initial guides to cluster the remaining Phase 1 candidate blocks 225. At this point in time, B1 and B2 serve as two separate rectangular regions 801 and 803 of the search space, R1 and R2, that will be grown to incorporate the remaining Phase 1 candidate blocks 225. Since in the preferred embodiment there are five Phase 1 candidate blocks 225, three candidates must be mapped to one of the two rectangular regions. Each candidate block 225 is characterized by the coordinates of its top-left corner. Each of the rectangular regions 801 and 803 is characterized by its area and its four corners composed from the extrema of the X-component and the Y-component of the candidates that have been agglomerated into that region. That is, the top-left corner of a rectangular region is at (Xmin, Ymin); the bottom-right corner is at (Xmax, Ymax); the bottom-left corner is at (Xmin, Ymax); and the top-right corner is at (Xmax, Ymin).
6. The distance from each remaining (i.e., unmapped) candidate block 225 to B1 and B2 is found. This is because R1 and R2 are initially a point respectively equivalent to B1 and B2.
7. The candidate exhibiting the smallest distance to a rectangular region is agglomerated to that region. However, if multiple candidates exhibit the same minimum distance to a given rectangular region, each is agglomerated to the respective rectangular region.
8. The coordinates of the four corners of the modified rectangular region(s) are computed by comparing the X and Y-component of the absorbed candidate(s) to the previous extrema of the rectangular region. The area of the modified rectangular region(s) is computed.

Either one or both of R1 or R2 may be modified depending on step 7.

9. If any of the candidates remains unmapped to one of the two rectangular regions, continue to step 10. Else, exit.
10. For each remaining candidate $B_i$:

Compute the resulting area that would result if $B_i$ is added to R1.

Compute the resulting area that would result if $B_i$ is added to R2.

11. The candidate block whose agglomeration would adds the smallest incremental area to a rectangular region is agglomerated to that region. However, if multiple candidate blocks exhibit the same minimum incremental area, each is agglomerated to the respective rectangular region.
12. The four corners of the modified rectangular region(s) are computed by comparing the X and Y-component of the absorbed candidate(s) to the previous extrema of the rectangular region. The new area of the modified rectangular region(s) is saved. Either one or both of R1 or R2 may be modified depending on step 11.
13. If any of the candidates remains unmapped to one of the two rectangular regions, go to step 10.
14. By applying the equations in step 3, the rectangular regions of search space area demarcated by R1 and R2 are respectively extended in each direction.

Part 2 guarantees the calculation of two rectangular regions of required search space area that result in the smallest aggregate area (i.e., the least amount of data required to be transferred into DSP Data RAM). In an alternative mode of this invention that does not provide this guarantee, the distance between a candidate to the closest corner of a rectangular area is used as the clustering criterion rather than the incremental area of rectangular region. In a third alternative mode of this invention that is simpler but has a smaller probability of producing the smallest aggregate area, steps 7 to 13 are replaced with the single step: Each remaining candidate is mapped to the closest of B1 and B2. When multiple rectangular regions of the search space need to be transferred in sequence, the region containing the (0,0) offset is always transferred first.

Although very uncommon, some implementations of the HME method (i.e., extremely large search spaces) may require more than two transfers from external memory to internal DSP Data RAM. In such cases, the transfers need to be dispatched in sequence to bring multiple rectangular sections of the search space. In the worst case, when the aggregate of the rectangular regions do not fit in internal DSP Data RAM, the search space required for the remaining candidates can be transferred into internal Data RAM while the matching criterion is being computed on candidates in a subset of the search space. It should be noted here that the method of computing required portion 701 just described puts no limitations whatever on the magnitudes of the motion vectors of the proximate blocks used to locate the candidate blocks.

As will be apparent from the foregoing, the techniques described above for calculating the area of required portion 701 of search space 219 are not limited to use with the internal DRAM of DSPs, but can be used in any situation where it is advantageous to move portions of the search space into memory that is more accessible to the processor which is doing the comparisons.

Conclusion

The foregoing Detailed Description has disclosed to those skilled in the arts to which the techniques for motion detection disclosed in the Detailed Description pertain the best mode presently known to the inventors of implementing their techniques. As will be immediately apparent to those skilled in the arts to which the techniques pertain, many other implementations of the techniques are possible. The exact implementation will of course depend on the encoding scheme employed and on the hardware used to do the encoding. The manner in which the threshold values for the method are determined in a given implementation will depend on the encoding scheme, the hardware, and the kind of application the encoding is being done for.

Other variations include the following: the temporal prediction of a block does not necessarily have to come from a block of the same size in the reference picture(s). Hence, portions of a block (e.g., quadrants) can be temporarily predicted from sub-blocks of equivalent dimensions in the reference picture(s). Moreover, the predictor for the current block does not necessarily have to come from a single reference picture but can be generated by choosing the best predictor from predictors obtained from several reference pictures. Alternatively, the predictor can be generated by combining the predictors from the reference pictures, for example, by using a weighted average. Further, the encoder engine can employ reference pictures that are either original pictures or pictures that have been reconstructed from their encodings. However, the encoder engine must employ the reconstructed version of the reference pictures to generate the equivalent digital error signals that compliant decoder engines generate during decompression and reconstruction of pictures. Additionally, the regions that are compared to find the predictor need not be rectangular in shape and the information employed to dynamically select proximate blocks and to shape the area used in the second phase of the search may vary from implementation to implementation.

Since the Detailed Description describes only one implementation of the motion estimation techniques and many other implementations that incorporate the principles of the motion estimation techniques are possible, it is apparent that the Detailed Description must be regarded as being in every respect illustrative and not restrictive and that the scope of the invention disclosed herein is not to be determined from the Detailed Description, but rather from the claims as interpreted with the full breadth permitted by the patent laws.

What is claimed is:

1. A method for determining whether a candidate region is to be considered as a predictor region, wherein the predictor region is used in estimating motion of a current region in a current picture of a sequence of digitally-represented pictures relative to a predictor region in a reference picture of the sequence, the method including the steps of:

determining motion vectors for a plurality of proximate regions that are proximate to the current region, the plurality of proximate regions including regions that are in the current picture and in a last encoded picture;

locating the candidate regions by applying the motion vectors from the proximate regions to the region in the reference picture that has the same spatial position in the reference picture that the current region has in the current picture;

comparing pixel information for the candidate region with pixel information in the current region; and determining whether a match between the pixel information in the candidate region and the pixel information in the current region satisfies a first threshold and if so the candidate region is to be considered as the predictor region, otherwise comparing pixel information for regions in an area centered on the candidate region with pixel information in the current region to determine the predictor region, wherein the area centered on the candidate region is non-rectangular and dynamically sized according to a number of processor cycles available in a processor cycle budget to perform the computation.

2. The method set forth in claim 1 wherein:

the proximate region in the last encoded picture is in the same spatial position in the last encoded picture that the current region is in the current picture.

3. The method set forth in claim 1 wherein:

the motion vector for the proximate region in the last encoded picture is determined from a motion vector for the proximate region in the last encoded picture and the temporal relationship between the reference picture, the current picture, and the last encoded picture.

4. The method set forth in claim 1, wherein the method of claim 1 is performed to determine at least some of a plurality of candidate regions and further comprising the step of:

determining an area in a search space from the plurality of candidate regions which contains all of the candidate regions.

5. The method set forth in claim 4 further comprising the step of:

copying the area into memory which is internal to a processor that performs the comparisons prior to performing the comparisons.

6. The method set forth in claim 4 wherein:

the step of determining the area determines a plurality of areas.

7. The method set forth in claim 6 wherein:

the step of determining the plurality of areas determines the areas such that the aggregate size of the areas tends toward a minimum.

8. The method set forth in claim 1, wherein in the step of determining whether a match satisfies a first threshold and otherwise comparing regions in the area centered on the candidate region, the regions are compared with the current region in an order of increasing distance from the candidate region.

9. The method set forth in claim 8, wherein the regions are compared until a match is found with the current region that satisfies a second pre-determined threshold.

10. The method set forth in claim 9, wherein the match required to satisfy the second threshold is closer than the match required to satisfy the first threshold.

11. The method set forth in claim 1, further comprising the step of:

dynamically shaping the area in accordance with a location of the at least one other candidate region relative to the current region.

12. The method set forth in claim 9, further comprising the steps of:

selecting the region in the reference picture that has the same spatial position in the reference picture that the current region has in the current picture as a first candidate region of a plurality of regions in the reference picture; and determining whether a match between the pixel information in the first candidate region and the current region satisfies a third threshold and if so the first candidate region is to be considered as the predictor region, otherwise comparing pixel information for other regions of the plurality of regions to determine the predictor region.

13. The method set forth in claim 12 wherein:

the third threshold is greater than the first threshold, which is greater than the second threshold.

14. The method set forth in claim 1 wherein:

the region is a block.

15. A method of refining an estimation of motion of a current region in a current picture of a sequence of digitally-represented pictures relative to a predictor region in a reference picture of the sequence, the method comprising the steps of:

defining a non-rectangular area in the search space of the reference picture that includes a candidate region in the reference picture that is the current best candidate to be the predictor region;

comparing regions in the non-rectangular area with the current region until the predictor region is found; and dynamically sizing the non-rectangular area according to a number of processor cycles available in a processor cycle budget to perform the comparison.

16. The method set forth in claim 15 wherein:

the regions in the non-rectangular area are defined by means of a look-up table.

17. The method set forth in claim 15 wherein:

the non-rectangular area has a diamond shape.

18. The method set forth in claim 15 wherein:

in the step of comparing regions in the non-rectangular area, the regions are compared with the current region in an order of increasing distance from the current best candidate.

19. The method set forth in claim 18 wherein:

in the step of comparing regions in the non-rectangular area, the order of increasing distance is a spiral outward from the current best candidate.

20. The method set forth in claim 15 further comprising the step of:

dynamically shaping the non-rectangular area in accordance with a location of the at least one other candidate region relative to the current region.

21. A method of defining an area in the search space in a reference picture of a sequence of digitally-represented pictures within which a search will be made for a predictor region for a current region of a current picture of the sequence, the method comprising the steps of:

for each region in a set of regions in the current picture that are proximate to the current region and for which a motion vector has already been computed, using the motion vector for the region to locate a candidate region in the reference picture;

dynamically sizing the area according to a number of processor cycles available in a processor cycle budget to perform the comparison; and using the candidate regions to define the area.

22. The method set forth in claim 21 wherein:

the motion vector may have any magnitude.

23. The method set forth in claim 21 further comprising the step of:

determining the area from the plurality of candidate regions such that the area contains all of the candidate regions.

24. The method set forth in claim 23 wherein:

in the step of using a motion vector for the region to locate a candidate region, the candidate region is located by applying the motion vector for the proximate region to a region in the reference picture which has the same spatial location in the reference picture that the current region has in the current picture.

25. The method set forth in claim 21 further comprising the step of:

copying the area into memory which is internal to a processor which performs the comparisons prior to performing the comparisons.

26. The method set forth in claim 25 wherein:

the step of determining the area determines a plurality of areas.

27. The method set forth in claim 26 wherein:

the step of determining the plurality of areas determines the areas such that the aggregate size of the areas tends toward a minimum.

28. The method set forth in claim 26 wherein:

one of the areas includes a region in the reference picture that has the same spatial position in the reference picture that the current region has in the current picture; and the areas are loaded separately into the memory which is internal to the processor, beginning with the one area that includes the region in the reference picture that has the same spatial position in the reference picture that the current region has in the current picture.

29. An improved method of using motion vectors of regions proximate to a current region in a current picture of a sequence of digital pictures to locate a predictor region for the current region in a reference picture of the sequence, the method including the steps performed for a given proximate region of locating a candidate region in the reference picture by applying the given proximate region's motion vector to a region in the reference picture which has the same spatial position in the reference picture that the current region has in the current picture and comparing the candidate region with the current region and the improvement comprising the steps of:

determining a number of CPU cycles currently available in a CPU cycle budget to perform the steps of the method; and determining a number of proximate regions for which the steps of the method are performed based on the number of CPU cycles currently available.

30. The method set forth in claim 29 wherein:

the proximate regions whose number is based on the number of CPU cycles currently available all have previously-computed motion vectors.

31. The method set forth in claim 30 wherein:

the step of determining a number of proximate regions adds additional proximate regions in order of increasing distance from the current region.

32. The method set forth in claim 30 wherein:

the step of determining a number of proximate regions selects additional proximate regions according to the motion vectors for blocks in the current picture whose motion vectors have already been determined.

33. A method of sizing an area in search space of a reference picture of a sequence of digitally-represented pictures for searching for a predictor region for a current region of a current picture of the sequence, the method comprising the steps of:

determining a number of CPU cycles currently available to search for the predictor region; and sizing the area according to the number of CPU cycles currently available.

34. The method set forth in claim 33 further comprising the steps of:

locating at least one other candidate region in the reference picture for the predictor region; and dynamically shaping the area in accordance with a location of the at least one other candidate region relative to the current region.

* * * * *

UNITED STATES PATENT AND TRADEMARK OFFICE
CERTIFICATE OF CORRECTION

PATENT NO.    : 6,195,389 B1
DATED         : February 27, 2001
INVENTOR(S)   : Rodriguez et al.

Page 1 of 1

It is certified that error appears in the above-identified patent and that said Letters Patent is hereby corrected as shown below:

Column 4,
Line 18, delete "comer" and insert therefore -- corner --
Line 20, delete "comer" and insert therefore -- corner --

Column 9,
Line 31, delete both occurences of "comer" and insert therefore -- corner --

Column 16,
Line 41, delete "usefull" and insert therefore -- useful --

Column 20,
Line 36, delete "comer" and insert therefore -- corner --
Line 38, delete "comers" and insert therefore -- corners --
Line 41, delete "comer" and insert therefore -- corner --
Line 43, delete both occurences of "comer" and insert therefore -- corner --

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*